United States Patent
Kim et al.

(10) Patent No.: US 12,214,343 B2
(45) Date of Patent: Feb. 4, 2025

(54) PREPARATION METHOD AND PREPARATION SYSTEM OF CARBON NANOTUBES

(71) Applicant: LG CHEM, LTD., Seoul (KR)

(72) Inventors: Og Sin Kim, Daejeon (KR); Uk Yeong Kim, Daejeon (KR); Se Hyun Kim, Daejeon (KR); Yon Jee Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 547 days.

(21) Appl. No.: 17/606,299

(22) PCT Filed: Jul. 29, 2020

(86) PCT No.: PCT/KR2020/010017
§ 371 (c)(1),
(2) Date: Oct. 25, 2021

(87) PCT Pub. No.: WO2021/029579
PCT Pub. Date: Feb. 18, 2021

(65) Prior Publication Data
US 2022/0203320 A1 Jun. 30, 2022

(30) Foreign Application Priority Data
Aug. 9, 2019 (KR) .......................... 10-2019-0097217

(51) Int. Cl.
*B01J 8/32* (2006.01)
*B01J 8/00* (2006.01)
*B82Y 40/00* (2011.01)
*C01B 32/162* (2017.01)

(52) U.S. Cl.
CPC ................. *B01J 8/32* (2013.01); *B01J 8/008* (2013.01); *C01B 32/162* (2017.08); *B01J 2219/00029* (2013.01); *B01J 2219/0059* (2013.01); *B01J 2219/00905* (2013.01); *B82Y 40/00* (2013.01); *C01B 2202/30* (2013.01); *C01B 2202/32* (2013.01); *C01B 2202/36* (2013.01); *C01P 2004/13* (2013.01); *C01P 2004/64* (2013.01); *C01P 2006/80* (2013.01)

(58) Field of Classification Search
CPC .... B01J 8/32; B01J 8/008; B01J 2219/00029; B01J 2219/0059; B01J 2219/00905; B01J 8/1827; B01J 8/24; C01B 32/162; C01B 2202/30; C01B 2202/32; C01B 2202/36; C01B 32/16; C01B 2202/20; B82Y 40/00; C01P 2004/13; C01P 2004/64; C01P 2006/80
See application file for complete search history.

(56) References Cited

U.S. PATENT DOCUMENTS

| | | |
|---|---|---|
| 2004/0000697 A1 | 1/2004 | Setoguchi et al. |
| 2005/0042162 A1* | 2/2005 | Resasco ................ D01F 9/1272 |
| | | 423/447.3 |
| 2010/0276644 A1 | 11/2010 | Wolf et al. |
| 2011/0158892 A1 | 6/2011 | Yamaki |
| 2012/0251433 A1 | 10/2012 | Gaillard et al. |
| 2015/0093323 A1* | 4/2015 | Koveal, Jr. ............ B01J 23/745 |
| | | 502/301 |
| 2017/0144887 A1* | 5/2017 | Li ........................ B82Y 40/00 |
| 2018/0002178 A1 | 1/2018 | Yoon et al. |

FOREIGN PATENT DOCUMENTS

| | | |
|---|---|---|
| CN | 106132871 | 11/2016 |
| CN | 107108221 | 8/2017 |
| JP | 2003-342840 A | 12/2003 |
| JP | 2010-30887 A | 2/2010 |
| KR | 10-2004-0002439 A | 1/2004 |
| KR | 10-2009-0013310 A | 2/2009 |
| KR | 20100073149 | 7/2010 |
| KR | 10-2011-0027715 A | 3/2011 |
| KR | 10-2014-0007195 A | 1/2014 |
| KR | 10-2014-0007197 A | 1/2014 |
| KR | 10-2014-0034159 A | 3/2014 |
| KR | 10-2014-0129639 A | 11/2014 |
| KR | 10-1487975 A | 1/2015 |
| KR | 10-2015-0027675 A | 3/2015 |
| KR | 10-2016-0109039 A | 9/2016 |
| KR | 10-2016-0109044 A | 9/2016 |
| TW | 201400407 A | 1/2014 |
| WO | 2016/144092 A1 | 9/2016 |

OTHER PUBLICATIONS

Gorsek, et al., Design of Batch Versus Continuous Processes Part I: Single-Purpose Equipment, Trans IChemE 1997; 75(A): 709-717 (Year: 1997).*
Partridge, Industrial Measurements I—Weighing, Industrial and Engineering Chemistry 1929; 21(8): 740-744 (Year: 1929).*

* cited by examiner

*Primary Examiner* — Daniel C. McCracken
(74) *Attorney, Agent, or Firm* — BRYAN CAVE LEIGHTON PAISNER LLP

(57) ABSTRACT

The present invention relates to a carbon nanotube preparation method and system, which may improve the overall efficiency and economic feasibility of a reaction by collecting fine particles including carbon nanotube particles that have not grown enough and an unreacted catalyst produced during and after the reaction by using a separator at the exterior of a fluidized bed reactor, and then, injecting the fine particles as a bed prior to a subsequent cycle.

10 Claims, No Drawings

PREPARATION METHOD AND PREPARATION SYSTEM OF CARBON NANOTUBES

The present application is a National Phase entry pursuant to 35 U.S.C. § 371 of International Application No. PCT/KR2020/010017 filed on Jul. 29, 2020, and claims priority to and the benefit of Korean Patent Application No. 10-2019-0097217, filed on Aug. 9, 2019, the entire contents of which are incorporated herein by reference.

FIELD

The present invention relates to a preparation method and a preparation system for efficiently and economically preparing carbon nanotubes.

BACKGROUND

Carbon nanotube materials include fullerenes, carbon nanotubes (CNTs), graphenes, graphite nanoplates, etc., and among them, carbon nanotubes are macromolecules in which planar graphite with a hexagonal honeycomb shape obtained by the combination of one carbon atom with three other carbon atoms, are rolled-up into nanometer-size diameters.

The carbon nanotubes are hollow and light, and are as electrically conductivity as copper, are as thermally conductive as diamond, and have a tensile strength as good as steel. According to the rolled-up shape, the carbon nanotubes may also be classified into single-walled carbon nanotubes (SWCNTs), multi-walled carbon nanotubes (MWCNT), and rope carbon nanotubes.

Such carbon nanotubes receive attention as a filler of various polymer composite materials such as an antistatic polymer composite material, a polymer composite material for shielding electromagnetic waves, and a high strength polymer composite material, Due to the excellent physical properties thereof, a great deal of research and development of polymer composite materials using carbon nanotubes on a commercial scale are being conducted.

Meanwhile, various methods have been studied as methods for preparing carbon nanotubes, but a method of synthesizing carbon nanotubes using a fluidized bed reactor is widely used in view of producing carbon nanotubes in large quantities. However, in case of synthesizing carbon nanotubes using a fluidized bed reactor, a portion of finally obtained carbon nanotube product is required to be injected into the reactor again for use as a bed in the reactor, and due to continuously generated an emitted gas including carbon nanotubes that have not grown enough, etc., the amount of the carbon nanotubes actually participating in the reaction may decrease, thereby inducing problems of reducing the production efficiency of the carbon nanotubes. In addition, a method of installing a separator for capturing carbon nanotubes that have not grown enough in the reactor has been studied to solve such problems, but in this case, other problems such as the precipitation of fine particles and corrosion have occurred due to the physical structure of the separator in the reactor. As another method, a method of continuously circulating particles separated during the reaction into the reactor by installing a separator at the exterior has been studied. However, in this case, problems of non-uniform product quality might arise due to the presence of carbon nanotubes that have not grown enough in the final product.

Accordingly, research on the preparation of carbon nanotubes by which carbon nanotubes that have not grown enough produced during the reaction may be suitably utilized, and accordingly, the efficiency of the preparation process of carbon nanotubes may be improved, and the quality of a carbon nanotube product finally obtained may be maintained, is required.

Prior Art Documents (Patent Document 1) KR 10-1487975
(Patent Document 2) PCT/KR2016/002342

SUMMARY

An object of the present invention is to solve the problems of the conventional preparation methods of carbon nanotubes and provide a preparation method for carbon nanotubes, improving productivity by capturing fine particles produced during and after the reaction at the exterior of a fluidized bed reactor and using the fine particles as a bed for a subsequent reaction.

The present invention provides a preparation method for carbon nanotubes, including a step of reacting a catalyst and a reaction gas including a carbon source gas and a flowing gas in a fluidized bed reactor to obtain carbon nanotubes (S1), a step of capturing a mixture gas produced during the performance of, and after finishing, the reaction of step S1 in a separator provided at the exterior of the fluidized bed reactor, and separating fine particles in the mixture gas (S2), and a step of injecting the fine particles thus separated as a portion of a bed in the fluidized bed reactor prior to initiating a subsequent reaction (S3), wherein a weight of the fine particles injected in step S3 is 1 to 30% by weight, based on the total weight of the bed.

In addition, the present invention provides a carbon nanotube preparation system comprising a fluidized bed reactor including a catalyst injecting part for injecting a catalyst, a gas injecting part for injecting a reaction gas including a carbon source gas and a flowing gas, an inside reaction space for performing a carbon nanotube producing reaction, a mixture gas exhaust part for exhausting a mixture gas, a separator provided at an exterior of the fluidized bed reactor provided with a separating space which is connected with the mixture gas exhaust part of the fluidized bed reactor for separating fine particles in the mixture gas, a storing space for storing the fine particles thus separated, a recovering part which is connected with the storing space of the separator and injecting the fine particles into the inside reaction space of the fluidized bed reactor prior to initiating a reaction.

If the preparation method and system of the present invention is used, fine particles which may act as impurities in a fluidized bed reactor during performing the reaction are separately captured and used as a bed in a subsequent reaction, and the overall productivity of carbon nanotubes may be increased. At the same time, the amount of the carbon nanotubes that have not grown enough in a final product is reduced to produce carbon nanotubes with high quality.

DETAILED DESCRIPTION

Hereinafter, the present invention will be explained in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Preparation Method of Carbon Nanotubes

The present invention provides a preparation method of carbon nanotubes, including a step of reacting a catalyst and a reaction gas including a carbon source gas and a flowing gas in a fluidized bed reactor to obtain carbon nanotubes (S1), a step of capturing a mixture gas produced during the performance of, and after finishing, the reaction of step S1 in a separator provided at the exterior of the fluidized bed reactor and separating fine particles in the mixture gas (S2), and a step of injecting the fine particles thus separated as a portion of a bed in the fluidized bed reactor prior to initiating a subsequent reaction (S3), wherein a weight of the fine particles injected in step S3 is 1 to 30% by weight, based on the total weight of the bed.

Carbon Nanotube Synthesis Step (S1)

Step S1 in the preparation method of the present invention is a step for producing carbon nanotubes by reacting a carbon source gas in the presence of a catalyst using a fluidized bed reactor. This step is a step for preparing carbon nanotubes through a fluidized bed reactor as in a conventional technique, and any step which may be applied for the preparation of carbon nanotubes through a fluidized bed reactor may be applied in this step, in addition to a method explained below, without specific limitation.

Any catalyst well-known to be used for preparing carbon nanotubes in this technical field may be used without specific limitation, and a commonly used heterogeneous catalyst having a composite structure of an active metal and a carrier, more particularly, a catalyst having a carrier catalyst type or a coprecipitation catalyst, may be used.

If the carrier catalyst is used as the catalyst, the catalyst has advantages in having higher bulk density than a coprecipitation catalyst and generating less fine particles having a size of 10 micrometers or less than a coporecipitation catalyst, thus suppressing an aggregation phenomenon of minute particles, reducing the possibility of the generation of fine particles due to abrasion likely to generate during a fluidization process, and stabilizing the operation of the reactor by having excellent mechanical strength itself.

On the other hand, if a coprecipitation catalyst is used as the catalyst, there are advantages in that the preparation method of the catalyst is simple and the cost of metal salts which are preferable as catalyst raw materials is low and the manufacturing cost is favorable. Furthermore, catalyst activity is high, because a specific surface area is large.

The carbon source gas is a carbon-containing gas which is capable of forming carbon nanotubes through decomposition at a high-temperature state, and particularly, various carbon-containing compounds including aliphatic alkane, aliphatic alkene, aliphatic alkyne, aromatic compounds, etc. may be used. More particularly, compounds including methane, ethane, ethylene, acetylene, ethanol, methanol, acetone, carbon monoxide, propane, butane, benzene, cyclohexane, propylene, butene, isobutene, toluene, xylene, cumene, ethylbenzene, naphthalene, phenanthrene, anthracene, acetylene, formaldehyde, acetaldehyde, etc., may be used.

Particularly, if methane, ethane, carbon monoxide, acetylene, ethylene, propylene, propane, butane and a liquefied petroleum gas (LPG), which is a mixture are used as the carbon source gas, there are advantages in that the injection into the reactor is easy, and process economic feasibility is excellent.

The flowing gas used in this step is for imparting the carbon nanotubes thus synthesized with fluidity, and any one may be used without limitation as long as it does not react with the carbon source gas but provides fluidity. For example, an inert gas may be used, particularly, nitrogen or argon gas may be used.

In this step, the reaction gas including the carbon source gas and the flowing gas may further include a reducing gas. The reducing gas is a gas capable of assisting with the production of carbon nanotubes, and any gas having reducibility may be used, and particularly, a hydrogen gas may be used.

The proportion of the carbon source gas to the flowing gas in the reaction gas injected in this step may be 0.1 to 0.5, preferably, 0.15 to 0.3, particularly preferably, 0.15 to 0.25. If the proportion of the carbon source gas is less than or greater than the range, a less amount or greater amount of the carbon source gas than an amount required for synthesizing the carbon nanotubes may be injected, and the carbon source gas not participating in the reaction may induce defects thus degrading overall efficiency and economic feasibility.

The reaction of this step is preferably performed at a temperature of 600 to 750° C. If the reaction temperature is lower than the lower limit, sufficient energy required for producing the carbon nanotubes is not supplied, and if the reaction temperature is higher than the upper limit, thermal decomposition of the catalyst, etc. may occur, and the reaction may not be performed smoothly.

The reaction in this step is preferably performed for 30 minutes to 2 hours. If the reaction time is too short, there are problems in that a large amount of carbon nanotubes that have not grown enough is produced, and carbon nanotubes having a desired degree of length and diameter are not produced. If the reaction time is too long, there are problems in that the overall efficiency of the reaction is deteriorated.

Any common fluidized bed reactor used for synthesizing carbon nanotubes may be used as the fluidized bed reactor used in the present invention, without specific limitation. Particularly, the fluidized bed reactor is provided with a distributer at a lower part, an expander at an upper part, may be provided with a gas injecting part for injecting a catalyst and a reaction gas to a lower part, and a mixture gas exhausting part for exhausting a mixture gas including the carbon nanotubes produced in an upper part.

Fine Particles Separation Step (S2)

Step S2 in the preparation method of the present invention is a step for capturing a mixture gas produced during, and after finishing, the reaction of step S1 in a separator provided at the exterior of the fluidized bed reactor, and separating fine particles in the mixture gas. In accordance with the characteristics of the fluidized bed reactor for flowing catalyst particles in the reactor and reacting with a raw material gas, during performing the reaction for synthesizing the carbon nanotubes, and after finishing the reaction in step S1, fine particles including relatively light carbon nanotubes that have not grown enough and unreacted catalyst particles continuously float at the upper part of the fluidized bed reactor. Fine particles including such carbon nanotubes that have not grown enough, and unreacted catalyst particles, may be easily discharged in a mixture gas type together with a flowing gas injected in the reactor through the upper part of the reactor. In this step, the mixture gas is captured through a separator provided at the exterior of the reactor, and then, the fine particles in the mixture gas are separated.

The fine particles separated in this step includes the carbon nanotubes that have not grown enough and unreacted catalyst particles. These fine particles may be injected to the fluidized bed reactor again to be utilized as a bed. In case of utilizing the fine particles as a bed again, the amount of the bed to be newly injected prior to each reaction cycle may be reduced, and overall reaction productivity may be improved. In addition, since unreacted carbon nanotubes produced during the reaction are removed and used as the bed, the ratio of the carbon nanotubes that have not grown enough in the carbon nanotubes obtained as a final product may be reduced, and carbon nanotubes having uniform and high quality may be advantageously produced.

The shape or type of the separator in this step is not specifically limited as long as it may separate solid particles present in the mixture gas. Preferably, a cyclone may be used. Fine particles separated through the cyclone may be collected at the lower part of the cyclone, and remaining gas may be exhausted out through the upper part. The fine particles collected at the lower part of the cyclone may be stored in a separate storage space and injected into the fluidized bed reactor again before initiating a new reaction cycle. The storage space may be provided with a weight measurement means for confirming the weight of the fine particles re-injected.

Re-Injection Step (S3)

Step S3 in the preparation method of the present invention is a step for injecting separated fine particles into the fluidized bed reactor as a portion of the bed prior to initiating a subsequent reaction. As explained above, the fine particles separated through the separator may be stored in a separate storage space and injected into the fluidized bed reactor as a bed prior to initiating a new reaction cycle.

In the present invention, the injection of the fine particles at a point prior to initiating a new reaction cycle as described above is conducted because if the fine particles are continuously injected during the reaction, a certain amount of carbon nanotubes that have not grown enough remain in the carbon nanotubes obtained at the finishing point of the reaction, and the quality of a carbon nanotube product may become non-uniform. In addition, if the fine particles are injected discontinuously like this, there are additional advantages of easy process operation because the amount of the bed to be newly injected may be easily calculated and injected from the weight of the particles obtained.

The weight of the fine particles injected in this step may be 1 to 30%, preferably, 2 to 20%, particularly preferably, 3 to 10%, based on the total weight of the bed. Considering the amount of the fine particles discharged during and after the reaction, the injection of the amount in the aforementioned range is preferable in view of the efficiency of overall processes. Particularly, if the weight of the fine particles injected in this step is too small, efficiency improvement effects are insignificant. If the weight is too large, the carbon nanotubes that have not grown enough may still remain in the final product. Accordingly, the uniform quality of a product may not be achieved, and the purity and specific surface area of a final carbon nanotube product may be degraded.

In addition, the carbon nanotube particles that have not grown enough included in the fine particles injected in this step may have an average diameter of 1 to 30 nm, preferably, 1 to 25 nm, particularly preferably, 1 to 20 nm. Since the characteristics of the present invention are not injecting the product of carbon nanotubes finally prepared to the reactor again, but re-injecting the carbon nanotubes that have not grown enough and unreacted catalyst particles discharged during and after the reaction, the diameter of the carbon nanotubes re-injected is relatively small. If carbon nanotubes having a diameter greater than those is re-injected, this means that sufficiently grown carbon nanotubes in a previous reaction cycle are re-injected into the bed, and it is not preferred in terms of the efficiency and economic feasibility of an overall process.

The purity of the fine particles injected in this step may be 85 to 95%, preferably, 87 to 93%. The purity may be calculated by an ash test method, and particularly, the purity may be obtained by injecting fine particles having a weight of A into a vacant crucible and burning in an oven at 700° C. or higher until all carbon nanotubes included in the fine particles are removed, measuring a weight B of a catalyst remaining in the crucible, and then, calculating by an equation below.

Purity (%)=$(A-B)/A*100$

Generally, the purity of product particles finally prepared through a fluidized bed reactor is 95% or more, but in the present invention, since fine particles including carbon nanotubes that have not grown enough are re-injected, it is preferable that the purity of the fine particles is in the aforementioned range. If the purity of the fine particles re-injected is less than the aforementioned range, the growing of carbon nanotubes in the fine particles re-injected may be insufficient, and the carbon nanotubes that have not grown enough may be mixed in a final product, and if the purity is greater than the aforementioned range, since sufficiently grown carbon nanotubes are re-injected, the preparation efficiency of the carbon nanotubes may be degraded.

The specific surface area of the fine particles injected in this step may be 200 $m^2/g$ to 240 $m^2/g$, preferably, 220 $m^2/g$ to 240 $m^2/g$. The specific surface area may be measured using a common method used for measuring a specific surface area, for example, using BELSORP BET measurement apparatus which is a measurement apparatus of a specific surface area.

Like the purity, the specific surface area of the product particles finally prepared using a common fluidized bed reactor is greater than 240 $m^2/g$, for example, greater than 240 $m^2/g$ and 275 $m^2/g$ or less. In the present invention, since fine particles including the carbon nanotubes that have not grown enough are re-injected, the specific surface area of the fine particles re-injected is smaller than the specific surface area of a final product. In case where the specific surface area of the fine particles re-injected is smaller than the aforementioned range, the growing of carbon nanotubes from the fine particles re-injected may be insufficient, and the specific surface area of a final product may not be controlled to a desired range, and if the specific surface area is greater than the aforementioned range, since sufficiently grown carbon nanotubes are re-injected, the preparation efficiency of the carbon nanotubes may be degraded.

The volume average particle size of the carbon nanotubes prepared through the preparation method of carbon nanotubes of the present invention may be 400 to 600 μm, and a number average particle size thereof may be 100 to 150 μm. If the preparation method of the present invention is used, carbon nanotubes having a relatively small size, that is, carbon nanotubes that have not grown enough having a small number average particle size act as a bed, and carbon nanotubes having a smaller number average particle size than a case of not re-injecting fine particles may be prepared.

Preparation System of Carbon Nanotubes

The present invention also provides a preparation system for performing the above-described preparation method of carbon nanotubes. The preparation system comprises a fluidized bed reactor including a catalyst injecting part for injecting a catalyst, a gas injecting part for injecting a reaction gas including a carbon source gas and a flowing gas, an inside reaction space for performing a carbon nanotube producing reaction, a mixture gas exhausting part for exhausting a mixture gas, a separator provided at an exterior of the fluidized bed reactor provided with a separating space which is connected with the mixture gas exhausting part of the fluidized bed reactor for separating fine particles in the mixture gas, a storing space for storing the fine particles thus separated, and a recovering part which is connected with the storing space of the separator and injecting the fine particles stored in the inside reaction space of the fluidized bed reactor prior to initiating a reaction.

The fluidized bed reactor in the system is an area where step S1 in the above-explained preparation method of carbon nanotubes is performed, and is provided with a catalyst injecting part for injecting a catalyst, a gas injecting part for injecting a carbon source gas corresponding to a reaction material, a flowing gas for providing fluidity and a reducing gas as necessary together. The fluidized bed reactor is provided with an inside reaction space for producing carbon nanotubes through the reaction of the carbon source gas, and a mixture gas exhausting part for exhausting a mixture gas including fine particles continuously produced during and after the reaction.

The shapes of the catalyst injecting part, the gas injecting part and the mixture gas exhausting part are not specifically limited as long as the role of each part is performed smoothly. For example, the catalyst injection part may have a shape of a transporting pipe. Meanwhile, in accordance with the characteristics of the fluidized bed reactor, the catalyst injecting part and the gas injecting part are preferably provided at the lower part of the fluidized bed reactor. The mixture gas exhausting part is preferably provided at the upper part of the fluidized bed reactor. Particularly, if the mixture gas exhausting part is positioned at the upper part of the reactor, there are technical advantages of selectively and easily discharging fine particles including relatively light carbon nanotubes that have not grown enough and unreacted catalyst particles.

The inside reaction space of the fluidized bed reactor is provided with a distributer. The carbon source gas, the flowing gas, and the optional reducing gas (if present), are injected through the gas injecting part and pass through the distributer. Then, these gases make contact with a catalyst to form carbon nanotubes at the surface of the catalyst. The shape of the distributer is not specifically limited, and the position thereof is not specifically limited, so long as it is higher than the gas injecting part.

The separator in the system is an area where step S2 in the above-explained preparation method of carbon nanotubes is performed. The separator of the present invention is positioned at the exterior of the fluidized bed reactor. If the separator is positioned in the fluidized bed reactor, the physical structure of the separator itself may act as an inhibiting factor in formation of carbon nanotubes, and particularly, the carbon nanotube particles formed may be precipitated in the separator structure, and defects inducing corrosion may arise.

The separator of the present invention may have various shapes and types, for example, a cyclone may be used. If the separator of the present invention is a cyclone, there are advantages of excellent separation performance of solid particles in the mixture gas and easy process operation.

In addition, the separator of the present invention may include a separate storage space. Since fine particles separated in the separator of the present invention are not immediately injected into the fluidized bed reactor but are injected into the bed of the fluidized bed reactor prior to initiating a new reaction cycle, a space for separately storing the fine particles is required. Accordingly, the separator of the present invention includes a separate storage space. The storage space may be provided in the separator and may be provided as a separate apparatus which is connected with the separator. The storage space is preferably positioned at the lower part of the separator considering discharging of a gas separated from the separator and storing a heavier solid in contrast to a gas.

The storage space may include a weight measurement means for confirming the weight of the fine particles re-injected. If the fluidized bed reactor is operated in a bath type, a certain amount of a bed is required to be injected before initiating the reaction, and accordingly, the weight of fine particles collected in the separator is required to be confirmed. A person skilled in the art would determine the amount of the bed to be injected into a subsequent reaction cycle considering the weight measured through the weight measurement means.

The recovering part in the system is an area for performing step S3 in the above-explained preparation method of carbon nanotubes. Particularly, the recovering part is connected with the storage space of the separator and plays the role of injecting the fine particles stored into the inside reaction space of the fluidized bed reactor prior to initiating the reaction. The shape or type of the recovering part is not specifically limited only if a means for injecting solid particles into the fluidized bed reactor is used. In addition, the recovering part may inject the fine particles through the catalyst injecting part of the fluidized bed reactor. If the recovering part is designed like this, it is preferable because a common catalyst injecting part may be utilized without establishing a separate line for injecting fine particles.

Hereinafter, embodiments and experimental embodiments will be explained in more detail to particularly explain the present invention, but the present invention is not limited to the embodiments and experimental embodiments. The embodiments according to the present invention may be modified in various other types, and the scope of the present invention should not be interpreted to be limited to the embodiments explained below. The embodiments of the present invention are provided to explain the present invention more completely to a person having average knowledge in the art.

Examples and Comparative Examples

An ethylene gas was used as a carbon source gas, a nitrogen gas was used as a flowing gas, and the carbon source gas was injected such that the ratio thereof among the total flowing amount of the reaction gas was 0.2. A Co-based carrier catalyst was used as a catalyst in $1/24$ of the mass of the ethylene gas injected, and the reaction was performed by controlling the reaction temperature to 670° C. and the reaction time to 1 hour. In addition, in Examples 1 to 12, fine particles collected in a previous reaction cycle were injected as a bed in ratios shown in Table 1 below prior to initiating the reaction. In Comparative Example 1, the fine particles were not injected, and in Comparative Example 2, carbon nanotubes were synthesized using a fluidized bed reactor with a separator installed inside thereof without injecting particles.

TABLE 1

| Example | 1 | 2 | 3 | 4 | 5 | 6 | 7 | 8 | 9 | 10 | 11 | 12 |
|---|---|---|---|---|---|---|---|---|---|---|---|---|
| Mass % of re-injecting fine particles with respect to total bed | 5.7 | 4.0 | 5.6 | 5.1 | 4.8 | 5.0 | 4.1 | 4.4 | 5.3 | 5.6 | 7.3 | 9.8 |

Experimental Example 1. Confirmation of Purity and Specific Surface Areas of Carbon Nanotubes Prepared in Examples and Comparative Examples The purity and specific surface areas of the carbon nanotubes prepared in the Examples and Comparative Example 1, and the purity and specific surface area of fine particles re-injected for each case of the Examples were confirmed, and the results are shown in Table 2. The purity and specific surface area were measured by the methods below.

1) Purity: An ash test method was used. Fine particles having a weight of A were injected into a vacant crucible and burnt in an oven at 700° C. or higher until all carbon nanotubes included in the fine particles were removed, and then, a weight B of a catalyst remaining in the crucible was measured, and the purity was calculated by an equation below.

Purity (%)=(A−B)/A*100

2) Specific surface area: Measurement was conducted according to a general measurement method of a specific surface area, and BELSORP BET measurement apparatus was used.

TABLE 2

| Division | Comparative Example | Example | | | | | | | | | | | |
|---|---|---|---|---|---|---|---|---|---|---|---|---|---|
| No. | 1 | 1 | 2 | 3 | 4 | 5 | 6 | 7 | 8 | 9 | 10 | 11 | 12 |
| Purity of final carbon nanotubes (%) | 95.5 | 95.5 | 95.5 | 95.8 | 95.8 | 95.8 | 95.5 | 95.7 | 95.3 | 95.7 | 95.7 | 95.7 | 95.7 |
| Specific surface area of final carbon nanotubes (m$^2$/g) | 255 | 254 | 255 | 244 | 249 | 256 | 250 | 247 | 253 | 248 | 247 | 245 | 252 |
| Purity of re-injecting fine particles (%) | — | 90.6 | 91.8 | 89.7 | 92.5 | 91.7 | 91.7 | 90.0 | 90.9 | 89.8 | 90.2 | 88.0 | 87.2 |
| Specific surface area of re-injecting fine particles (m$^2$/g) | — | 233 | 225 | 217 | 239 | 235 | 234 | 228 | 226 | 229 | 241 | 226 | 220 |

From the results of Table 2, it was confirmed that carbon nanotubes with similar purity were prepared, and the specific surface areas of the carbon nanotubes prepared were also similar even though fine particles were re-injected and used as a bed when compared with a case not re-injecting fine particles, and accordingly, such re-injection of particles did not adversely influence the quality of a carbon nanotube product finally produced.

In addition, the purity and specific surface area of the fine particles re-injected in the present invention showed different effects on the purity and specific surface area of a final product, and it was confirmed that there was a difference between a method utilizing a common product as a bed and the preparation method of the present invention.

Experimental Example 2. Comparison of Productivity of Examples and Comparative Examples The productivity of the carbon nanotubes prepared in the Examples and Comparative Examples 1 and 2, that is, the amounts produced of carbon nanotubes per 1 cycle of reaction (1 batch) were compared and shown in Table 3 below. As the productivity of the Examples, an average value of the productivity of Examples 1 to 12 is recorded.

TABLE 3

|  | Examples | Comparative Example 1 | Comparative Example 2 |
|---|---|---|---|
| Productivity (kg/batch) | 9.71 | 9.15 | 9.35 |

As confirmed from Table 3 above, it was confirmed that the productivity was improved by about 6% in case of using fine particles as a bed again as in the present invention when compared with an otherwise case as in Comparative Example 1, and the productivity was also improved by about 4% when compared with Comparative Example 2 in which a separator was installed in the reactor, and carbon nanotubes that have not grown enough and unreacted catalyst particles were partially utilized.

Experimental Example 3. Confirmation of Particle Size of Carbon Nanotubes Prepared in Examples and Comparative Example The volume average particle sizes and number average particle sizes of carbon nanotubes prepared in Examples 1 to were confirmed. The volume average particle size and number average particle size of carbon nanotubes prepared in Comparative Example 1 were also confirmed. The measurement of the volume average particle size and number average particle size were conducted using a particle size measurement apparatus generally used for measuring particle size (Microtrac Bluewave Co.), and measurement results are shown in Table 4 below.

TABLE 4

|  | Volume average particle size (μm) | Number average particle size (μm) |
|---|---|---|
| Examples 1-12 | 455.98 | 106.3 |
| Comparative Example 1 | 451.45 | 139.7 |

From Table 4 above, it was confirmed that if the preparation method of the present invention was used, carbon nanotubes having a volume average particle size similar to that obtained by a common method were prepared. Meanwhile, for the number average particle diameter, it was confirmed that carbon nanotubes having a smaller number average particle size were prepared in the present invention because fine particles having a small number average particle size were re-injected, and the re-injected fine particles acted as a bed.

The invention claimed is:

1. A carbon nanotube preparation method, the method comprising:
   a reaction comprising reacting a catalyst and a reaction gas comprising a carbon source gas and a flowing gas in a fluidized bed reactor to produce carbon nanotubes;
   capturing a mixture gas produced during, and after finishing, the reaction in a separator provided at the exterior of the fluidized bed reactor, and separating fine particles in the mixture gas; and
   injecting the fine particles thus separated as a portion of a bed in the fluidized bed reactor prior to initiating a subsequent reaction,
   wherein a weight of the fine particles injected in the bed of the fluidized reactor is 1 to 30% by weight, based on a total weight of the bed and wherein a purity of the fine particles is 85 to 95%.

2. The preparation method according to claim 1, wherein the weight of the fine particles injected in the bed of the fluidized reactor is 3 to 10% by weight based on the total weight of the bed.

3. The preparation method according to claim 1, wherein the fine particles comprise carbon nanotube particles and unreacted catalyst particles.

4. The preparation method according to claim 3, wherein the carbon nanotube particles contained in the fine particles have an average diameter of 1 to 20 nm wherein a weight of the fine particles injected in the bed of the fluidized reactor is 1 to 30% by weight, based on a total weight of the bed.

5. The preparation method according to claim 1, wherein a specific surface area of the fine particles is 200 $m^2$/g to 240 $m^2$/g.

6. The preparation method according to claim 1, wherein the reaction gas further comprises a reducing gas.

7. The preparation method according to claim 1, wherein a proportion of the carbon source gas to the flowing gas of the reaction gas is 0.1 to 0.5.

8. The preparation method according to claim 1, wherein the reaction is performed at a temperature of 600 to 750° C.

9. The preparation method according to claim 1, wherein the reaction is performed for 30 minutes to 2 hours.

10. The preparation method according to claim 1, wherein the preparation method is operated in a batch type.

* * * * *